Figure 1:
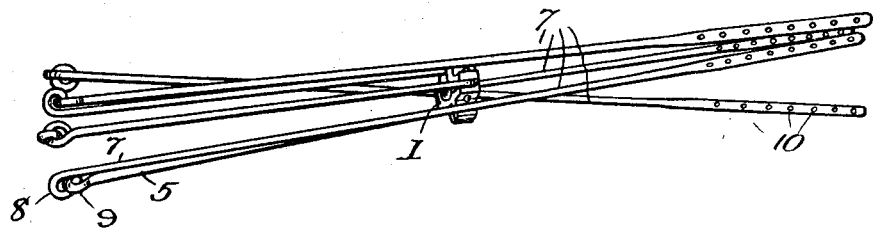

T. F. BROWN.
TREE STANDARD.
APPLICATION FILED MAR. 5, 1914.

1,137,253. Patented Apr. 27, 1915.

WITNESSES:
L. A. Snyder
E. T. DeGiorgi

INVENTOR
Thomas F. Brown
BY
Henry M. Love
ATTORNEY

UNITED STATES PATENT OFFICE.

THOMAS F. BROWN, OF BATH, NEW YORK.

TREE-STANDARD.

1,137,253.  Specification of Letters Patent.  Patented Apr. 27, 1915.

Application filed March 5, 1914. Serial No. 822,568.

*To all whom it may concern:*

Be it known that I, THOMAS F. BROWN, a citizen of the United States of America, residing at Bath, in the county of Steuben and State of New York, have invented certain new and useful Improvements in Tree-Standards, of which the following is a specification, reference being had therein to the accompanying drawing.

My invention relates to an improved standard, and I declare that the following is a full, clear, concise and exact description thereof, sufficient to enable one skilled in the art to make and use the same, reference being had to the accompanying drawings in which like reference characters refer to like parts throughout.

The mechanisms included in the invention are particularly applicable in the support of Christmas trees which, of course, are of varying height and diameter and have their branches irregularly disposed on the trunk. My device is particularly applicable to such conditions since by its construction it is fitted to support trees of varying diameters and of any location of the branches. It is also adaptable to rest on an uneven floor or surface still holding the tree in a perfectly vertical position.

Another feature of the device is that it is collapsible and can be folded into a small compass.

Figure 2:
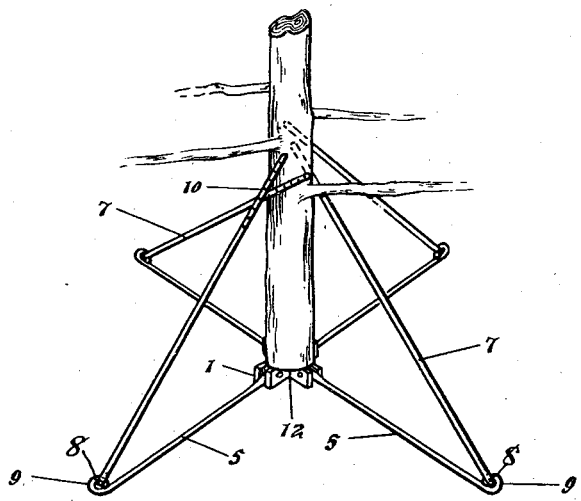
Figure 3:
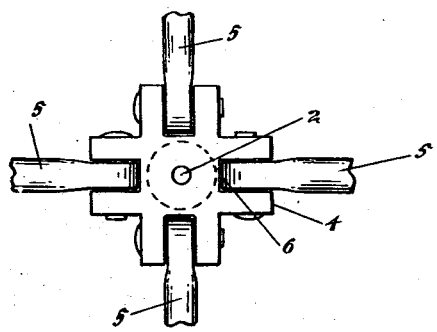

In the drawings Figure 1 is a view of the device in partially folded position; Fig. 2 shows the device in open position with the tree supported therein, and Fig. 3 is a plan view of a central portion of the device with the arms, broken away, mounted thereon.

Referring to the drawings in detail, 1 represents the base having a central bore at 2 through which a spike or screw may be driven into the base or trunk of the tree which is cut off square at the bottom and rests upon the base in the position indicated generally by the dotted lines. The base 1 has four shoulders, one projecting at each quarter of the circle, the shoulders comprising two pieces, indicated at 4, forming a saddle. In this saddle is pivotally mounted arm 5, the inner end being rounded, as indicated at 6, so that each may swing into position substantially parallel to the others, as indicated in Fig. 1. At the end of each arm there is an eye 9 and in this is hooked the guy 7 which has an eye 8 interfitting with eye 9. The guy 7 is of indefinite length, but at its outer or free end has a plurality of holes 10 through which nails may be driven into the trunk or branches of the tree to hold the tree upright on the base 1. These holes in the end of the guys 7 allow for any possible adjustment which may be necessary to secure the tree but without cutting off any of the branches. And it is also evident that the eyes 8 of the guys 7 being somewhat loose in the eyes 9 of the arm 5 there is a simple and adequate adjustment for any size diameter of tree. The feature of the device in short is, that it provides for the supporting of the butt of the tree vertically on a surface which may be out of plane, and for fitting the standard to any size or kind of tree. When it is desired to take down the standard the bars or arms 5 are folded downward (Fig. 2) so that they lie side by side and the guys are severally placed to lie in the spaces, indicated at 12, between the shoulders of the base-plate.

Having described my invention, what I claim as new and desire to secure by Letters Patent, is:

The combination in a holder for a tree or the like, of a base plate adapted to receive thereupon the butt of a tree, and be secured thereto, a plurality of arms separately pivoted at their inner ends to said base plate, and adapted to be separately adjusted to a considerable degree radially and off of the horizontal and guy rods loosely mounted upon the outer ends of said arms and provided toward their free ends with a series of holes whereby said free ends may be secured at convenient points to the trunk of a tree.

In testimony whereof I hereunto affix my signature in the presence of two witnesses.

THOMAS F. BROWN.

Witnesses:
FRED MCCONNELL,
LEON J. KEMP.